United States Patent [19]

Bonnaure

[11] 3,942,658

[45] Mar. 9, 1976

[54] INSTALLATION FOR AGGLOMERATION OF MINERALS ON A CONTINUOUS CIRCULAR GRATE

[75] Inventor: Edouard Bonnaure, Le Vesinet, France

[73] Assignee: Creusot-Loire Entreprises, Paris, France

[22] Filed: Aug. 19, 1974

[21] Appl. No.: 498,522

[30] Foreign Application Priority Data

Aug. 30, 1973 France .............................. 73.31345

[52] U.S. Cl................. 214/18 R; 104/137; 104/162; 214/46.34; 214/62 R; 266/21

[51] Int. Cl.² ..................... F27B 21/00; B65G 67/30

[58] Field of Search........... 214/18 R, 21, 46.34, 64, 214/62 R, 318; 104/162, 137; 266/21; 432/137

[56] References Cited

UNITED STATES PATENTS

| | | | |
|---|---|---|---|
| 464,455 | 12/1891 | Day | 104/137 |
| 1,434,030 | 10/1922 | Stone | 214/46.34 |
| 2,763,382 | 9/1956 | Bell | 104/137 X |
| 3,614,076 | 10/1971 | Schmidt et al. | 266/21 |

*Primary Examiner*—Robert G. Sheridan

*Attorney, Agent, or Firm*—Cameron, Kerkam, Sutton, Stowell & Stowell

[57] ABSTRACT

An installation for the agglomeration of minerals including, a rotatable circular track, a plurality of grate-carrying cars which rest on the track and move with it through various treatment zones, and a device for moving the cars relative to the track through a discharge zone. The device may tilt each car as it passes through the discharge zone in order to unload treated minerals from the grate on the car.

3 Claims, 7 Drawing Figures

INSTALLATION FOR AGGLOMERATION OF MINERALS ON A CONTINUOUS CIRCULAR GRATE

The present invention relates to an installation for agglomeration of minerals on a continuous circular grate. It relates more particularly, by way of example, to sinterizing ferrous minerals.

A known installation for continuous agglomeration of minerals comprises two portions: a movable straight line grate for the agglomeration proper, and a cooler for the agglomerated products. An improved agglomeration installation has been proposed which comprises a single grate upon which the operations of agglomeration and then of cooling take place in succession. An installation of this kind was, for example, the object of the French Pat. No. 2,053,095 filed on July 15, 1969. A single grate like this for agglomeration and cooling has advantages such as better metallurgical quality of the agglomerate and elimination of sensitive installations of crushing and screening the hot products.

Installations having a single straight line grate, however, suffer from the disadvantage that the whole of the return strand of the chain constitutes a dead zone of the installation and at any moment only half of the cars are employed. The employment of a circular grate has therefore been suggested, in which the discharge of the product is effected by shovel-wheels which rake the product of the chain as rotation proceeds. Although intended more especially for another metallurgical process, French Pat. No. 2,199,556 filed by the same Applicant on Sept. 15, 1972 gives an example of an installation of this kind. Such installations suffer from the disadvantage that the shovel-wheels bring about a not inconsiderable degradation of the finished products.

The present invention corrects the above stated disadvantages and provides an installation for agglomeration of minerals which is relatively inexpensive whilst preserving in the agglomerate its intrinsic qualities.

According to the present invention there is provided an installation for agglomeration of minerals on a circular grate, comprising: a succession of independent grate-carrier cars which, in use, move through successive loading, ignition, baking, cooling and discharge zones, the wheels of each car resting on two circular co-axial tracks which in use are driven simultaneously and continuously at the same adjustable constant angular speed, and, in the discharge zone, a cyclically operable device for individual displacement of the cars with respect to the tracks, which device is independent of the driving of the tracks, the duration of the cycle of operation of the device being proportional to the angular speed of the tracks.

The invention will be better understood from the following description of preferred embodiments thereof, given by way of example only, and illustrated by the attached drawings, wherein.

Figure 1:
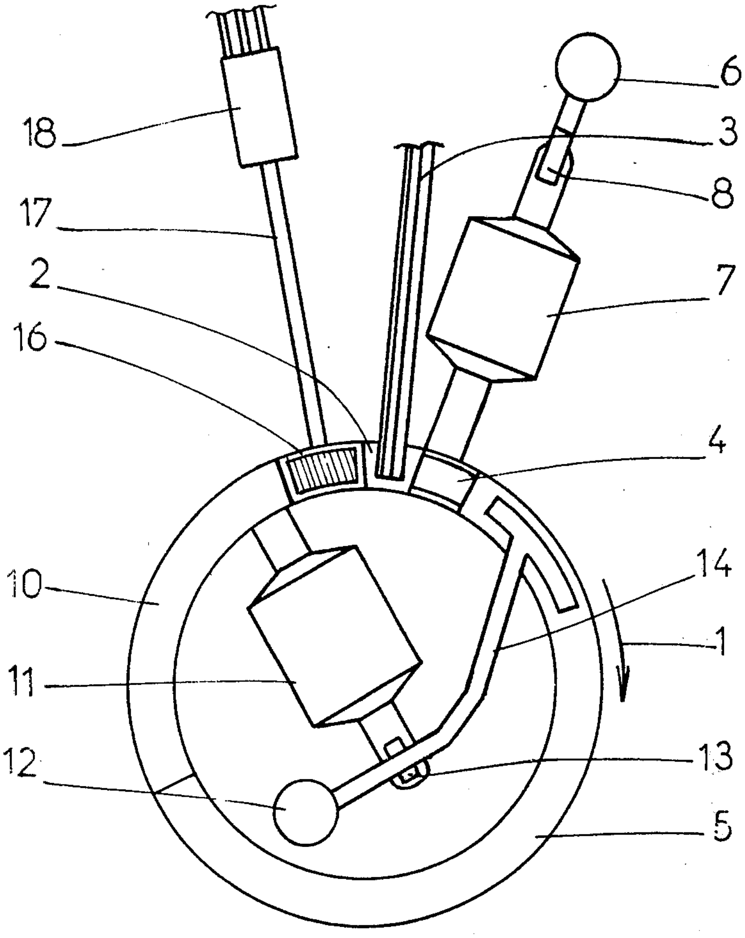
FIG. 1 is a diagrammatic plan view of an embodiment of installation for agglomeration of ferrous minerals, in accordance with the invention.

Referring to FIG. 1 of the drawings, there is shown a circular grate comprising a succession of cars. In use, the grate moves in the direction indicated by the arrow 1. In the zone 2 the cars receive from a conveyor 3 inert materials intended to protect the grate and the mixture to be agglomerated. The cars thus loaded pass next into the ignition zone 4 and then into the baking zone 5. In these zones 4 and 5 baking gases are drawn under the grate to a chimney 6 by way of a dust-extractor 7 and a fan 8.

After the baking zone the cars and the agglomerated materials pass into a cooling zone 10 in which cooling fumes are collected under the grate. The collected fumes pass through a dust-extraction at 11 to the chimney 12 under the influence of a fan 13. The cooling fumes may be totally or partially returned as fuel into the baking zone 5 through the channels 14.

Finally, after cooling of the agglomerate, the cars enter the discharge zone 16 where there is located a device for emptying the cars. After discharge the coarse agglomerate passes to a known lump-breaker assembly (not shown) and is then moved by a conveyor 17 towards the screen plant 18 where separation is effected into various sizes of granules.

Figure 2:
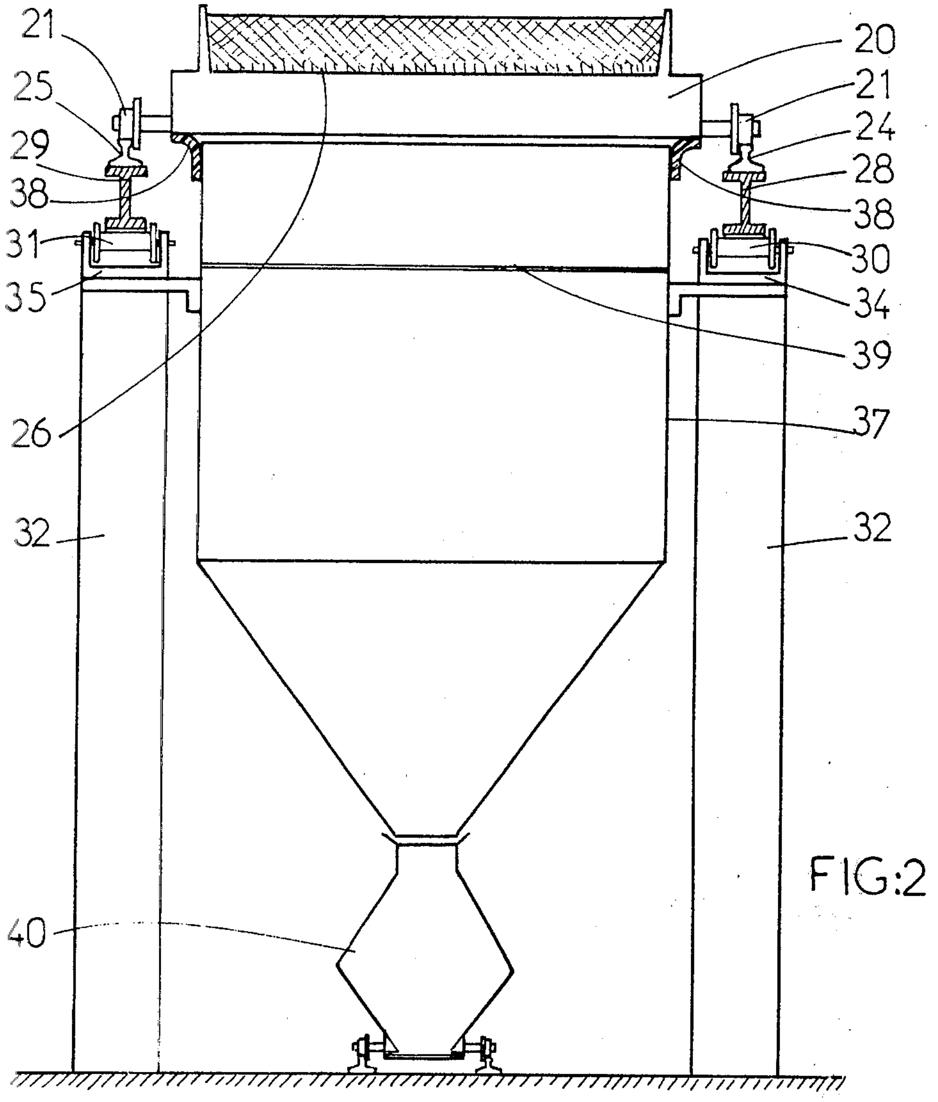
FIG. 2 is a vertical section through the baking or cooling zone of the installation of FIG. 1.
Figure 3:
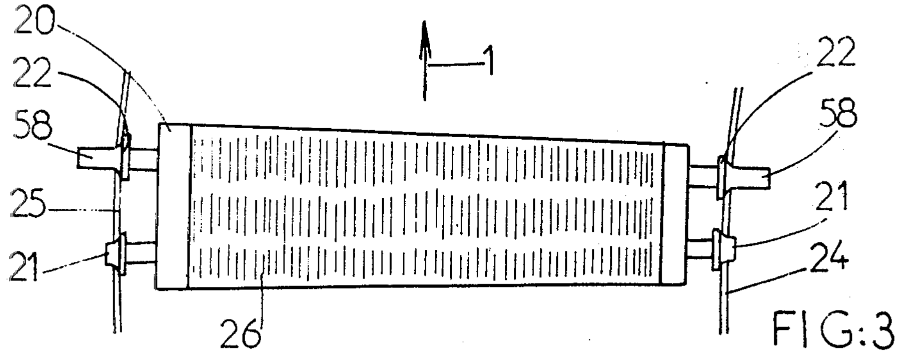
FIG. 3 is a top plan view of a grate-carrier car of the installation of FIGS. 1 and 2.

Referring next to FIGS. 2 and 3, it will be seen that each of the cars of the circular grate comprises a frame 20 which rests by four wheels 21 and 22 on two circular concentric rails, an inner rail 24 and an outer rail 25. The frame 20 of the car supports a grate bar 26 and has the shape of a portion of a circular sector, being slightly narrower at the end next to the inner rail 24 than at the end next to the outer rail 25, so that the cars together define a continuous annular grate surface.

The circular rails 24 and 25 are supported respectively upon two circular concentric girders 28 and 29 which in turn are supported on a series of idler rollers 30 and 31 mounted on support columns 32 of the installation by means of supports 34 and 35. In use, the circular girders 28 and 29 are driven in continuous rotation at the same angular speed by suitable means (not shown), for example, by teeth integral with each of the circular girders and meshing with a driving pinion, the two driving pinions being mechanically or electrically synchronized.

In the baking and cooling zones lower fume collectors 37 are fixed to the support columns 32. Continuous blades 38 of flexible plastics material are fixed to the collectors 37 to seal against machined faces of the cars. A partial vacuum created within collectors 37 draws fumes downwardly through the grate. Inside the collectors 37 deflector-plates 39 direct the fumes downwards. Dust is removed from the lower hoppers of the collector 37 automatically by a car 40 which circulates on the ground along a track co-axial with the grate and which positions itself under the various hoppers in accordance with a predetermined programme.

The loaded cars 20 which rest on the circular rails 24 and 25 are driven through the successive zones 2, 4, 5 and 10, by reason of friction between wheels 21 and the rails 24 and 25 rotate with the circular girders 28 and 29. In these zones the cars therefore do not roll along the rails but revolve with the same continuous motion as the circular girders.

Figure 4:
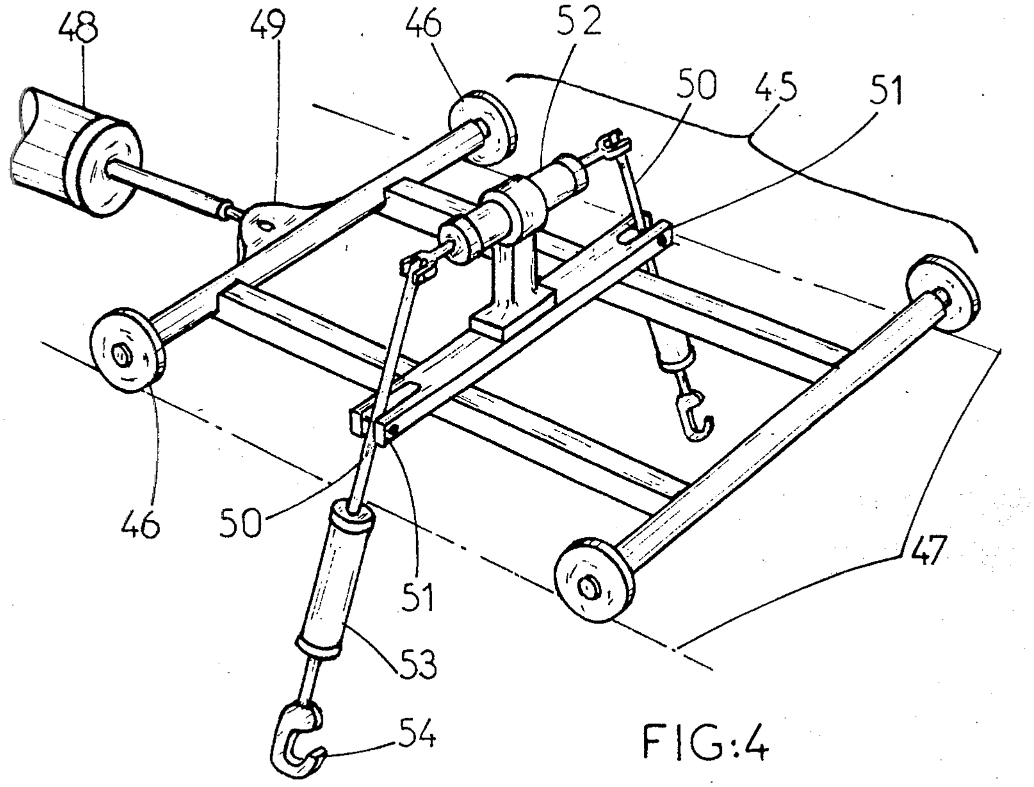
FIGS. 4 and 5 illustrate a cyclical device for individual displacement of the cars.
Figure 5:
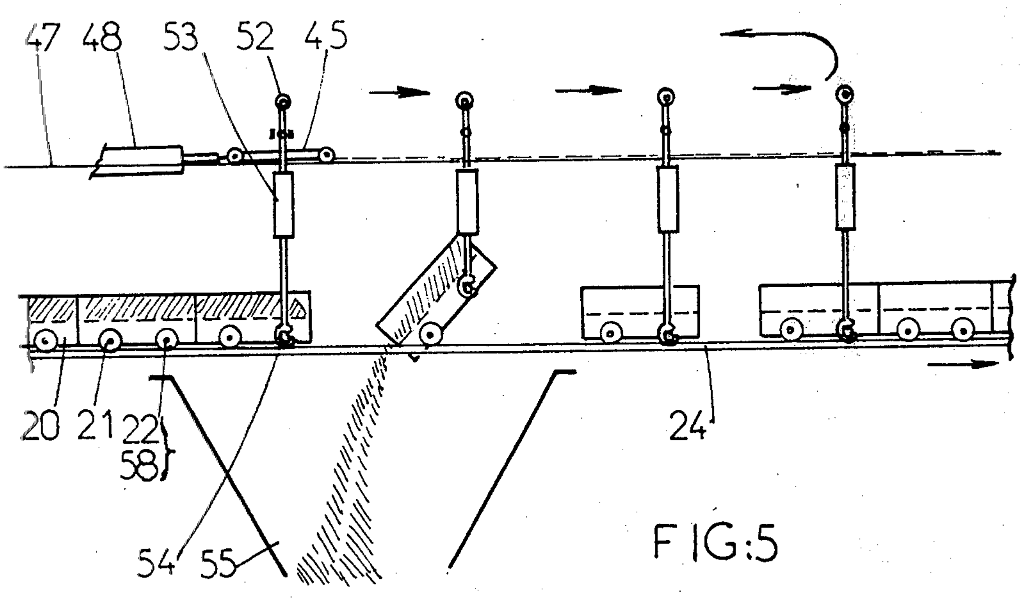

Reference will now be made to FIGS. 4 and 5 which illustrate a device enabling discharge of the cars in the discharge zone 16. This discharging device comprises a manipulator-car 45 which by wheels 46 can run along a track 47 arranged above the grate and co-axial with the track formed by the two circular rails 24 and 25. Motion may be imparted to the car 45 by a hydraulic jack 48 the rod of which is hingedly connected at 49 to the car, the body of the jack being hingedly connected to the frame of the installation.

The car 45 has two control-arms 50 hinged at 51 so as to move in a plane radial to the installation. The two arms 50 can be set in motion symmetrically by means of a double jack 52. A jack 53 is incorporated into each arm 50 and enables its length to be varied. The rod of each jack 53 has a hook 54. Of course, the jacks 48, 52 and 53 are provided with pipework and control regulators which have not been represented on the drawings for the sake of clarity. The various apparatus and connections necessary for the manipulation of such jacks are entirely conventional and within the understanding of those skilled in the art.

The succession of operations leading to the discharge of a car is illustrated in FIG. 5. When a grate-carrier car 20 arrives at the entry to the discharge zone 16 the car 45 is located above it on the track 47 in such a way that the front axle of car 20 which carries wheels 22 is in the same radial plane as the arms 50 of the car 45. In this waiting position the jacks 53 of the arms 50 are in the extended position and the hooks 54 are substantially aligned with the axis of the front axle of the car 20, but because the jacks 52 are retracted the hooks are spaced laterally on opposite sides of the car 20. It will be observed by reference again to FIG. 3 that the front wheels 22 of the car 20 have a projection 58 which jut out on opposite sides of the assembly.

When the front axle of the car 20 is just in the radial plane of the arms 50 the jack 52 is operated to move the hooks 54 onto the projections 58 of the front axle; the car 20 in question is then locked together with the control car 45. The car 45 is next moved forwards by means of the jack 48 at a speed higher than the linear speed of the circular girders, thus at a speed higher than that of the other cars. The car 20 locked to the car 45 is thus separated from the next succeeding car and runs on the rails 24 and 25. When the car is sufficiently separated from the next succeeding car the jacks 53 are retracted thereby lifting the front axle of the car 20 whilst the rear wheels continue to run freely on the rails. When the tilt of the car is sufficient the agglomerated cake slides into the bottom receiver-hopper 55. The jacks 53 then bring the front wheels back onto the rails 24 and 25. The car 25 continues to move relative to rails 24, 25 until the car 20 which it is driving comes gently into contact with the car emptied previously. By the action of the jack 52 the arms 50 are separated, freeing the car 20 to be driven as before by the rails 24 and 25 upon which it rests freely. By retraction of the jack 48 the control car 45 is brought back to its starting position in order to empty the next car. The duration of a cycle of manipulation of the car 45 is equal to the time necessary for the circular girders 28 and 29 to move by the length of a grate-carrier car. Thus in its return position the manipulator-car 45 finds another grate-carrier car ready to be taken over for discharge.

It is seen that in the discharge zone the control of the grate-carrier cars is independent of the general drive of the assembly of cars. However, it is obvious that the total duration of the operational cycle of the control car 45 is subordinated to the speed of rotation of the circular girders 28 and 29 in such a way that if one were led to modify the general shape of the installation the duration of the operating cycle of the car 45 should be modified in order that at the beginning of each operating cycle it should always be in the appropriate position for locking itself to the next grate-carrier car.

Figure 6:
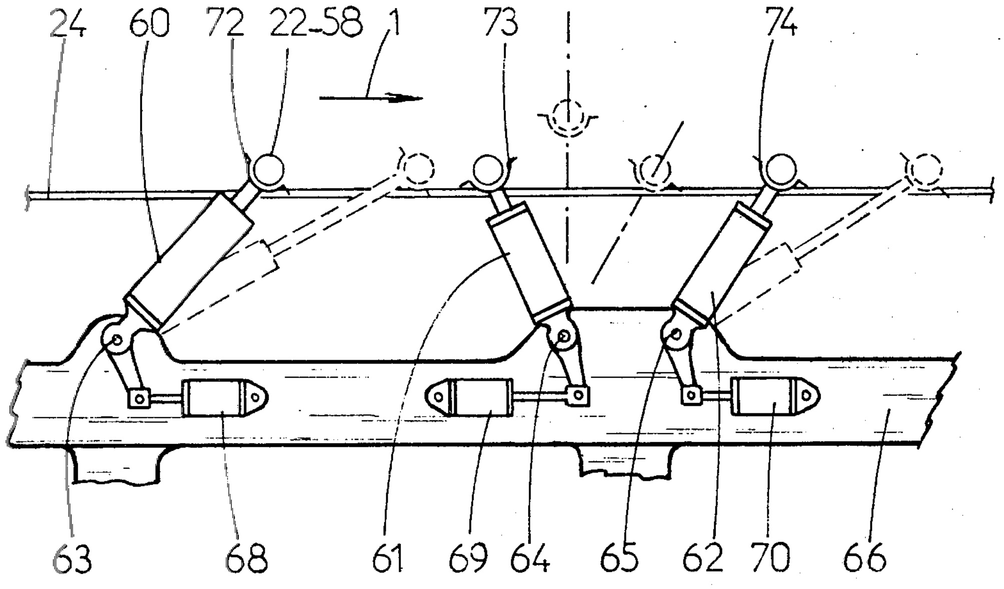
FIGS. 6 and 7 illustrate another embodiment of the device for individual displacement of the cars, employing systems of oscillating jacks.
Figure 7:
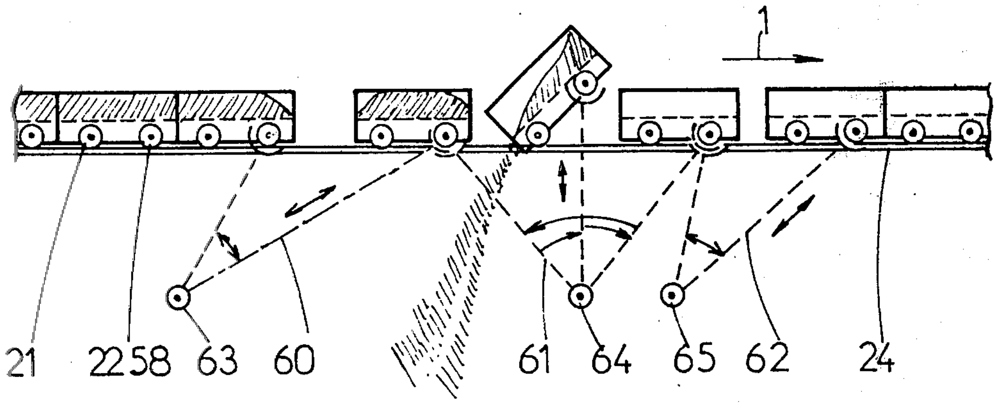

Referring now to FIGS. 6 and 7, there will be seen another variant upon the device for individual manipulation of the grate-carrier cars in the discharge zone. The previously described device may in fact in certain installations suffer from the disadvantage that because it is exposed to dust from the installation it must be protected by a casing the interior of which is maintained at slightly above atmospheric pressure. In the device of FIGS. 6 and 7 the manipulator members are arranged on opposite sides of the movable grate and partly below it, which facilitates their protection against dust.

The device of FIGS. 6 and 7 comprises, on each side of the grate, a set of three main jacks 60, 61 and 62, the bodies of which are respectively pivotally mounted at 63, 64 and 65 on a longitudinal beam 66 at the side of the installation. Each of the three main jacks can oscillate about its pivot under the action of a respective control jack 68, 69 and 70, likewise pivotally mounted on the longitudinal beam 66 and of which the rod acts on a crank secured to the main jack. Here again the pipework for feeding the several main and control jacks has not been shown in order to simplify the drawing. The various connections enabling automatic operation of the jacks will be specified below.

When the front axle of a car 20 reaches the entry to the discharge zone the jack 60 starts to be extended and a fork 72 located at the tip of its rod is applied to the extension 58 to the wheel 24 of the car. The combined movement of the jacks 60 and 68 imparts to the car 20 a thrust in the direction normal to its travel but without lifting the car above the rails 24 or 25; this motion of the car 20 takes place, however, at a speed higher than the speed of the group of cars, and the car taken over is therefore separated from the next succeeding car, running along the rails 24 and 25.

When the action of the jacks 60 and 68 has sufficiently separated the car to be discharged from its immediate successor the jack 60 is retracted and returns to its starting position. At the same time the jacks 61 starts its extension and the jack 69 gives to it a motion of rotation about the pivot 64. A fork 73 fixed to the rod of the jack 61 takes over the front axle of the car, which has been abandoned by the jack 60 and the respective motions of the jacks 61 and 69 bring about a raising of this front axle above the rails 24 and 25, which causes tilting of the car about its rear axle; the cake of agglomerate slides into the bottom hopper as has been described above. At the end of the motion of the jacks 61 and 69 the front axle of the car is put back on the rail and then the jack 61 is retracted and returns to the starting position whilst the front axle is taken over by a fork 74 at the end of the rod of the jack 62. The jack 62 associated with the rocker jack 70 continues to push the car, but the respective speeds of the two jacks are adjusted so that the linear speed of the car diminishes up to the moment at which it rejoins the preceding car; it is then abandoned by the jack 62 and is no longer driven save by the uniform motion of the rails 24 and 25 which support it.

It may be observed that the above described installation enables the employment of cars which can be emptied by tilting in association with the advantages of a circular grate which needs a fewer cars than a linear grate since it has no return strand. It will be observed again that with respect to a conventional straight-line grate an installation of the above described type is much lower due to the fact that the fume collectors are installed directly under the grate itself. The fume ducts are moreover considerably simplified. Finally, the grate bars are much easier to fix onto the cars because the cars are simply tilted and never turned upside down.

Of course the invention is not strictly limited to the embodiments which have been described by way of example, but it likewise covers other embodiments which fall within the scope of the claims. Thus one might use other variants for the control of the tilting of the cars in the discharge zone and, for example, a device associated with thrusters for taking over the cars individually with tilting-ramps for the front axle.

What is claimed is:

1. An installation for agglomeration of minerals on a circular grate, having: a succession of independent grate-carrier cars each of said cars having a front and a rear axle moving through successive loading, ignition, baking, cooling and discharge zones, wheels for each car including wheels on said rear axle, two circular co-axial tracks receiving said wheels driven simultaneously and continuously at the same adjustable constant angular speed, a cylically operable device in the discharge zone independent of the driving of the tracks for individual displacement of said cars with respect to said tracks, the duration of the cycle of operation of said device being proportional to the angular speed of the tracks, said device for individual displacement of said grate-carrier cars including an auxiliary control car movable along a path co-axial with said tracks, articulated arms for said control car, seizure means for said arms engageable with a member at the front portion of each of said cars, means for manipulating said arms, and a retractable jack for said arms operable to raise the front portion of each of said cars from said tracks to tilt each of said cars about its rear axle.

2. An installation for agglomeration of minerals according to claim 1, said device including a set of pivoted jacks and means of synchronising the motions of said jacks for pushing and tilting said cars.

3. An installation for agglomeration of minerals according to claim 2, said set including three jacks one of said jacks displacing a grate-carrier car at a speed higher than the speed of said tracks, another of said jacks raising the front of the car above said tracks to tilt the car about its rear axle, and the third of said jacks displacing the car after emptying at a progressively decreasing speed until the car reaches the speed of displacement of said tracks.

* * * * *